US005660089A

United States Patent [19]

Chow

[11] Patent Number: 5,660,089

[45] Date of Patent: Aug. 26, 1997

[54] PLIERS FOR GRIPPING WORKPIECES OF DIFFERENT SIZES

[76] Inventor: Jessie Chow, No. 18, Hou Juan Road, Taichung, Taiwan

[21] Appl. No.: 524,638

[22] Filed: Sep. 7, 1995

[51] Int. Cl.$^6$ ........ B25B 7/04

[52] U.S. Cl. ........ 81/413; 81/407

[58] Field of Search ........ 81/413, 407, 385, 81/355, 409.5, 427, 427.5, 357

[56] References Cited

U.S. PATENT DOCUMENTS

| | | | |
|---|---|---|---|
| 434,409 | 8/1890 | Sutton et al. | 81/427 |
| 474,987 | 5/1892 | Church | 81/413 |
| 4,651,598 | 3/1987 | Warheit | 81/407 |
| 4,662,252 | 5/1987 | Warheit | 81/385 |
| 5,351,584 | 10/1994 | Warheit | 81/413 |

FOREIGN PATENT DOCUMENTS

| | | | |
|---|---|---|---|
| 2353041 | 5/1974 | Germany | 81/413 |

*Primary Examiner*—Bruce M. Kisliuk
*Assistant Examiner*—Joni B. Danganan
*Attorney, Agent, or Firm*—Charles E. Baxley, Esq.

[57] ABSTRACT

A pair of pliers includes a handle member having an intermediate portion slidably engaged in an intermediate portion of another handle member which has a rack located close to the handle end. A pawl is pivotally secured on the handle member for engaging with the rack so as to secure the intermediate portions of the handle members together when the jaw ends are engaged with the workpiece. The intermediate portions of the handle members have no slots such that the strength of the handle members can be greatly increased.

3 Claims, 8 Drawing Sheets

PLIERS FOR GRIPPING WORKPIECES OF DIFFERENT SIZES

BACKGROUND OF THE INVENTION

1. Field of the Invention

The present invention relates to a utility plier, and more particularly to a utility plier for gripping workpieces of different sizes.

2. Description of the Prior Art

Typical pliers comprise a pair of handles having a middle portion pivotally coupled together so as to form a pair of jaw members and a pair of hand grips for moving the jaw members toward each other so as to grip a workpiece. However, the jaw members may not be adjusted one relative to the other such that the pliers may be used for gripping workpieces of smaller sizes.

In order to grip the workpieces of different sizes, various kinds of pliers have been developed. Two of the conventional pliers are disclosed in FIGS. 13 and 14 respectively and each includes a pair of handle members 10, 15 having a pair of jaw members 13, 14 formed in one end thereof for gripping a workpiece. One of the handle members 10 includes a stud 12 secured on the intermediate portion, and the other handle member 15 includes an elongate slot 11 formed in the intermediate portion and includes a number of teeth 16, 17 formed along the inner edge of the elongate slot 11 (FIG. 13) or formed along the bottom side of the intermediate portion for engaging with the stud 12. The stud 12 may be adjusted along the elongate slots 11 so as to adjust the distances between the jaw members 13, 14 and as to grip workpieces of different sizes. However, the users have to adjust the stud 12 relative to the teeth 16, 17 before the pliers may be used to grip the workpieces.

Another type of the pliers are disclosed in U.S. Pat. No. 4,651,598 to Warheit and U.S. Pat. No. 4,662,252 to Warheir. The conventional pliers each includes a pair of handle members. One of the pliers includes an intermediate neck portion slidably engaged in the neck portion of the other pliers. A fastening means is provided to halt the further sliding movement of the handle members. The handle members should include a pair of longitudinal slots or raceways for slidably receiving the fastening means. However, the pawls slidably engaged in the handle members will be limited to a small size. In addition, the toothed end of the pawls may not effectively engage with the racks of the slots. Furthermore, in all of the conventional pliers, the longitudinal slots greatly reduce the strength of the handle members and such that the pliers may be easily damaged.

The present invention has arisen to mitigate and/or obviate the afore-described disadvantages of the conventional pliers.

SUMMARY OF THE INVENTION

The primary objective of the present invention is to provide a plier which includes a pair of handle members having no slots formed therein such that the strength of the handle members may be greatly increased.

In accordance with one aspect of the invention, there is provided a pair of pliers comprising a first and a second handle members including a first and a second jaw ends, a first and a second handle ends and a first and a second intermediate portions formed between the first and the second jaw ends and the first and the second handle ends respectively, the first intermediate portion of the first handle member including a pair of parallel planar members for slidably receiving the second intermediate portion of the second handle member therebetween, the first intermediate portion of the first handle member including a rack means located closer to the first handle end and including a contact surface means located closer to the first jaw end, the second handle member including a stop means secured on the second jaw end thereof for engaging with the contact surface means and for preventing the second intermediate portion from disengaging from the first intermediate portion, means for biasing the second jaw end away from the first jaw end, a pawl means pivotally secured on the second intermediate portion and including a toothed end for engaging with the rack means and including a contact end for engaging with the rack means and for preventing the toothed end from engaging with the rack means, and means for biasing the contact end of the pawl means to engage with the rack means, the second jaw end being moved away from the first jaw end so as to grip a workpiece of larger size, the stop means being caused to engage and to move along the contact surface means when the first and the second handle ends are moved toward each other in order to move the first and the second jaw ends toward each other so as to grip the workpiece, the second handle member being moved relative to the first handle member so as to rotate the pawl means in order to engage the toothed end with the rack means and so as to secure the first and the second intermediate portions together when the first and the second jaw ends grip the workpiece therebetween. The first intermediate portion includes a solid configuration having no slots formed therein so as to increase a strength of the first handle member.

A panel means is pivotally coupled to the first handle end of the first handle member, a plate means is pivotally coupled to the second end of the second handle member and pivotally coupled to the panel means at a shaft, the plate means includes a curved slot having a curvature located at the shaft, and the panel means includes a pin element extended therefrom and slidably engaging with the curved slot so as to limit a rotational movement between the panel means and the plate means.

A cover means is further secured to the second handle member for covering and for protecting the pawl means.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
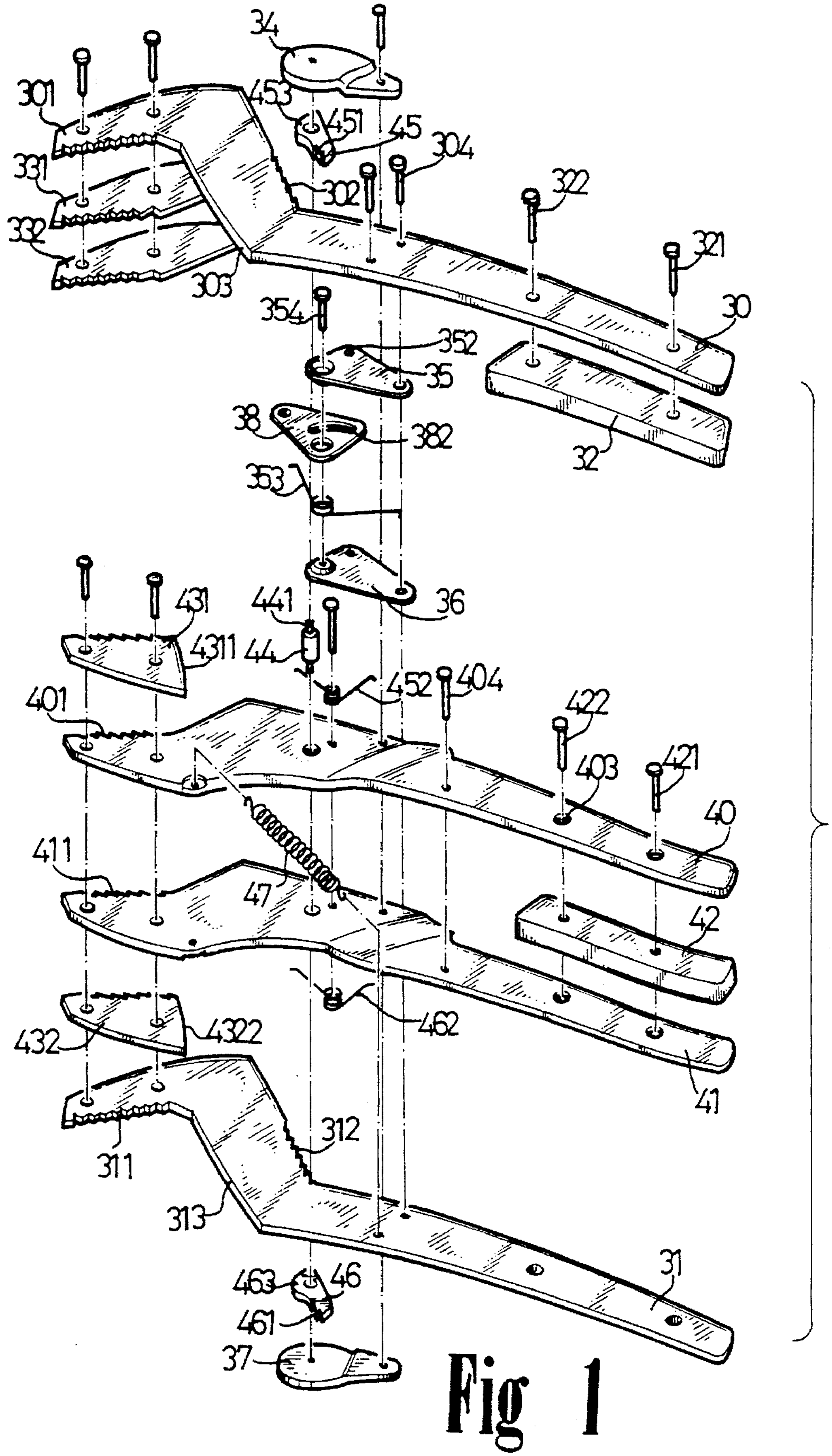
FIG. 1 is an exploded view of a utility plier in accordance with the present invention.

Referring to the drawings, and initially to FIGS. 1 to 4, a utility plier in accordance with the present invention comprises a pair of handle members 30, 40 each including a jaw end and a handle end and an intermediate portion. The handle member 30 includes two planar members 31 having two spacers 331, 332 fixed between the jaw ends 301 and having a spacer 32 secured in the handle end by rivets 321, 322. The jaw ends 301 each includes a number of teeth 311 formed therein for engaging with the workpieces. The handle member 30 includes a pair of racks 302, 312 formed in one edge of the intermediate portions of the planar members 31 and located closer to the handle ends and each includes a contact surface 303, 313 located closer to the jaw ends. The handle member 40 also includes two planar members 41 having a spacer 42 fixed between the handle ends by rivets 421, 422 and having two stops 431, 432 fixed on the jaw ends 401 which include a number of teeth 411 formed therein for engaging with the workpieces, together with the jaw ends 301 of the handle member 30. The stops 431, 432 each includes a contact edge 4311, 4322 for engaging with the respective contact surface 303, 313 of the handle member 30 and for preventing the jaw ends 401 from disengaging from the handle member 30.

Figure 2:
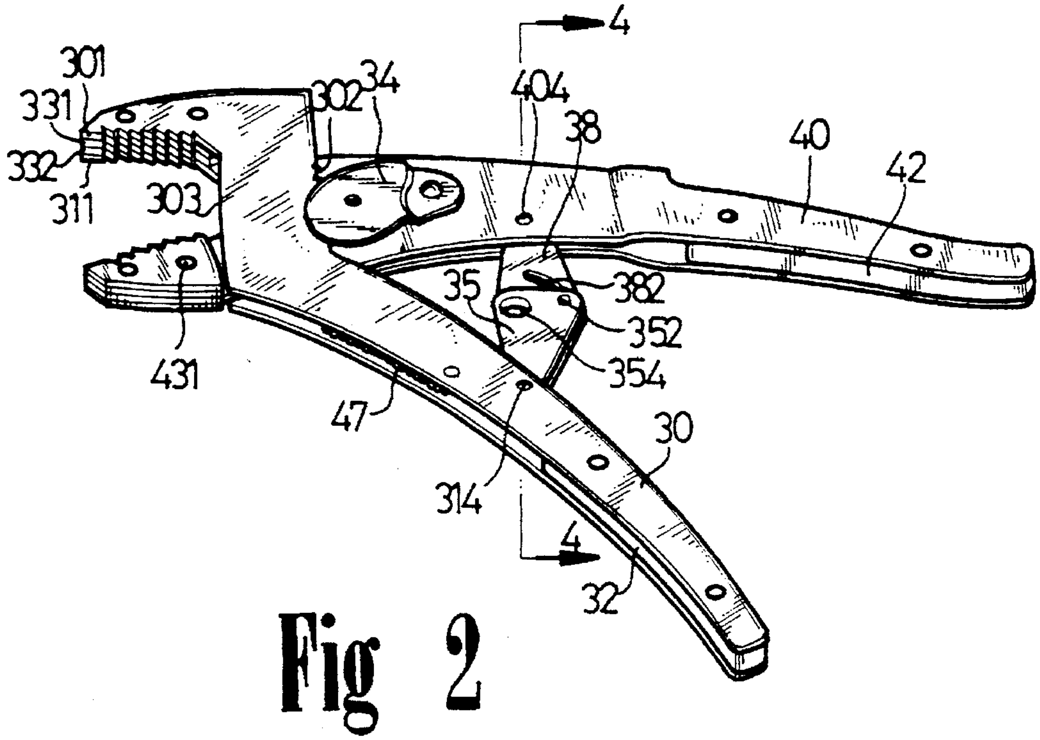
FIG. 2 is a perspective view of the utility plier.
Figure 3:
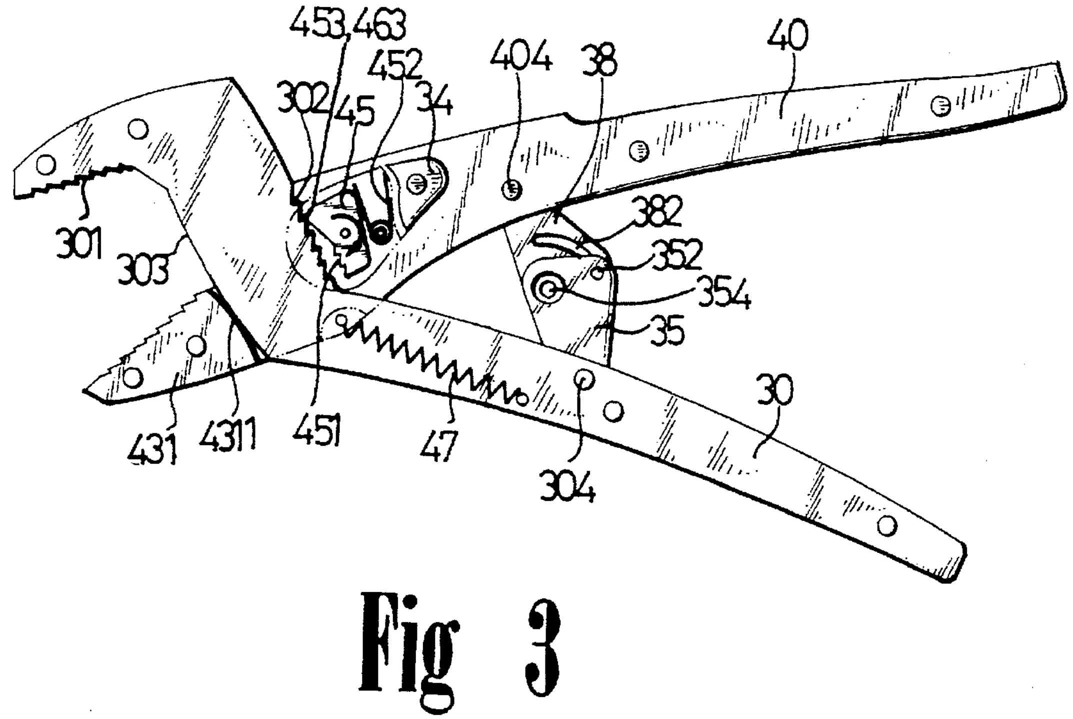
FIG. 3 is a plane view of the utility plier.
Figure 4:
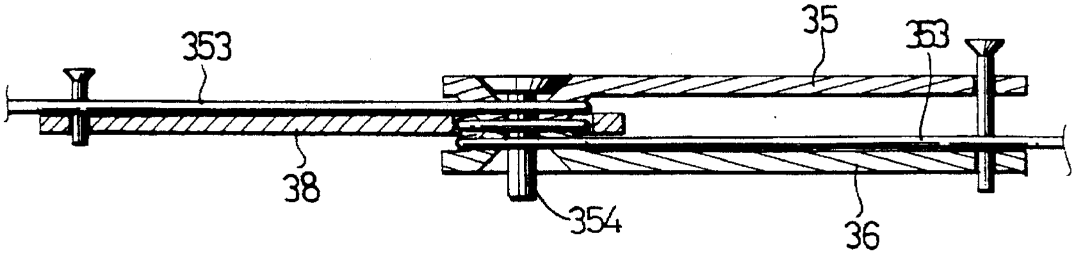
FIG. 4 is a partial cross sectional view taken along lines 4—4 of FIG. 2.

As best shown in FIGS. 2 and 3, the intermediate portion of the handle member 40 is slidably engaged between the intermediate portions of the planar members 31 of the handle member 30. A spring 47 is coupled between the intermediate portion of the handle member 40 and the handle end of the other handle member 30 so as to bias the jaw end of the handle member 40 away from the jaw end of the handle member 30. A rod 44 is fixed in the intermediate portion of the handle member 40 and includes two ends 441 extended therefrom. A pair of pawls 45, 46 are pivotally coupled to the rod 44 and are engaged on both sides of the handle member 40 and each includes a toothed end 451, 461 for engaging with the racks 302, 312 of the handle member 30 and each includes a rounded contact end 453, 463 for slidably engaging with the racks 302, 312. A pair of covers 34, 37 are secured to the intermediate portion of the handle member 30 and are secured to the ends 441 of the rod 44 for covering the pawls 45, 46. A pair of springs 452, 462 are biased between the covers 34, 37 and the pawls 45, 46 for biasing the rounded contact ends 453, 463 of the pawls 45, 46 to engage with the racks 302, 312, best shown in FIGS. 3 and 6.

A plate 38 has one end pivotally coupled to the handle member 40 by an axle 404 and has a curved slot 382 formed therein. A pair of panels 35, 36 have one end pivotally coupled to the handle member 30 by an axle 304 and are pivotally coupled to the plate 38 at a shaft 354 and have a pin 352 secured thereto for slidably engaging with the curved slot 382 of the plate 38. The curved slot 382 has a curvature center located at the shaft 354 such that the panels 35, 36 and the plate 38 may be rotated relative to each other about the shaft 354. The sliding engagement of the pin 352 in the curved slot 382 may limit the rotational movement between the panels 35, 36 and the plate 38. A spring 353 is biased between the panels 35, 36 for biasing the pin 352 to engage in one end of the curved slot 382.

Figure 7:
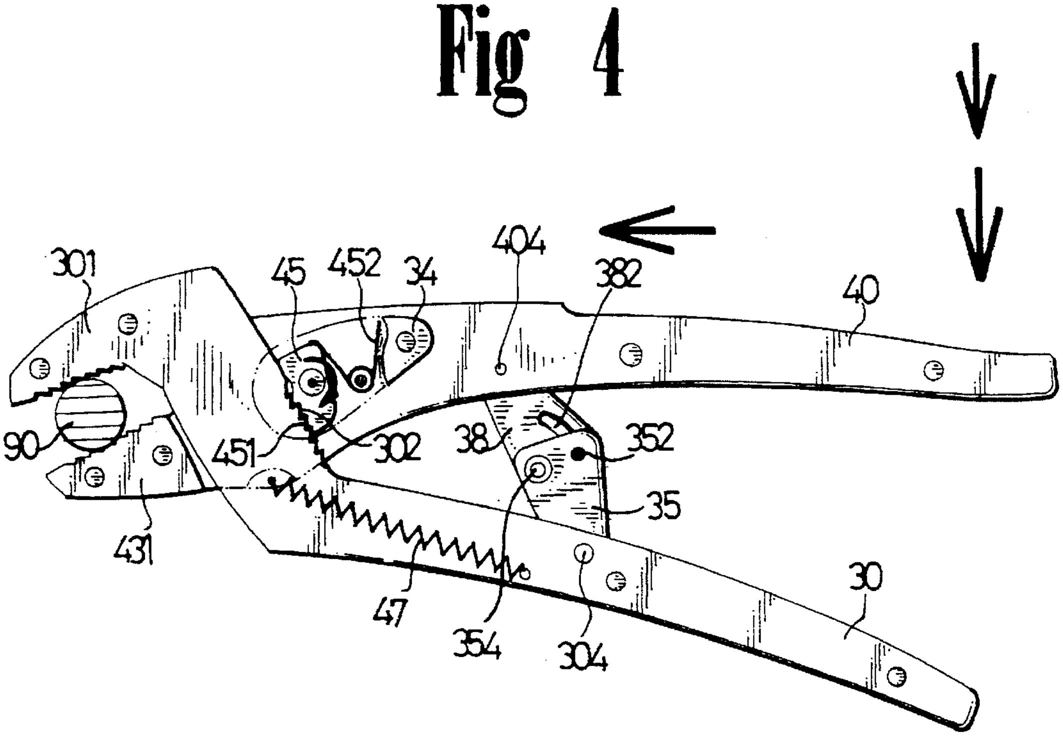
FIGS. 6 and 7 are plane views illustrating the operation of the utility plier.
Figure 5:
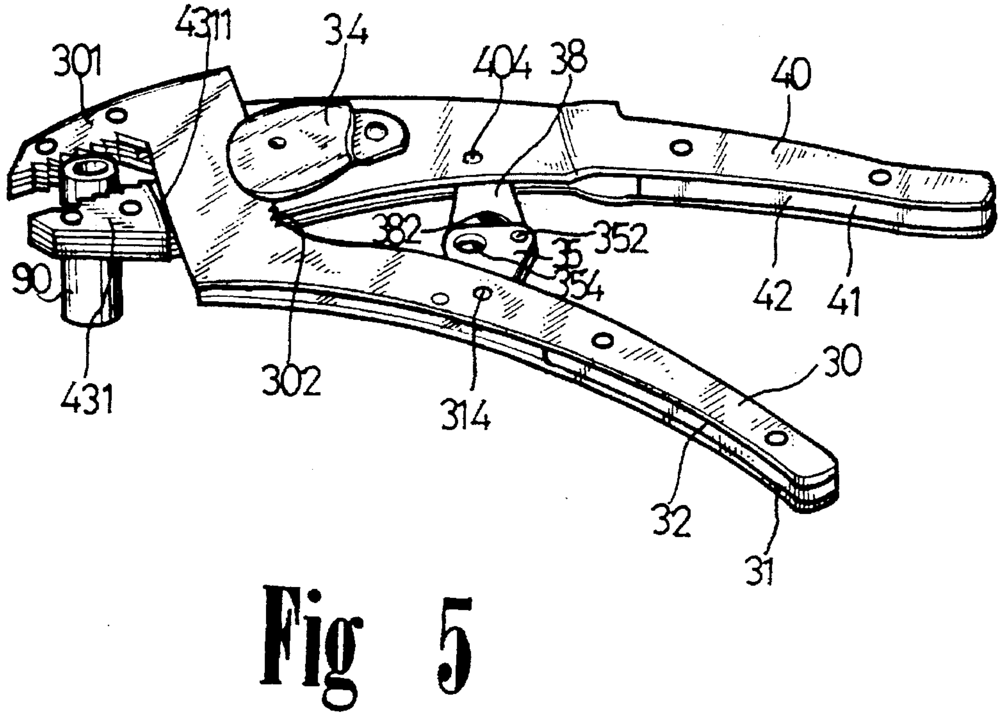
FIG. 5 is a perspective view of the utility plier illustrating the operation of the utility plier.
Figure 6:
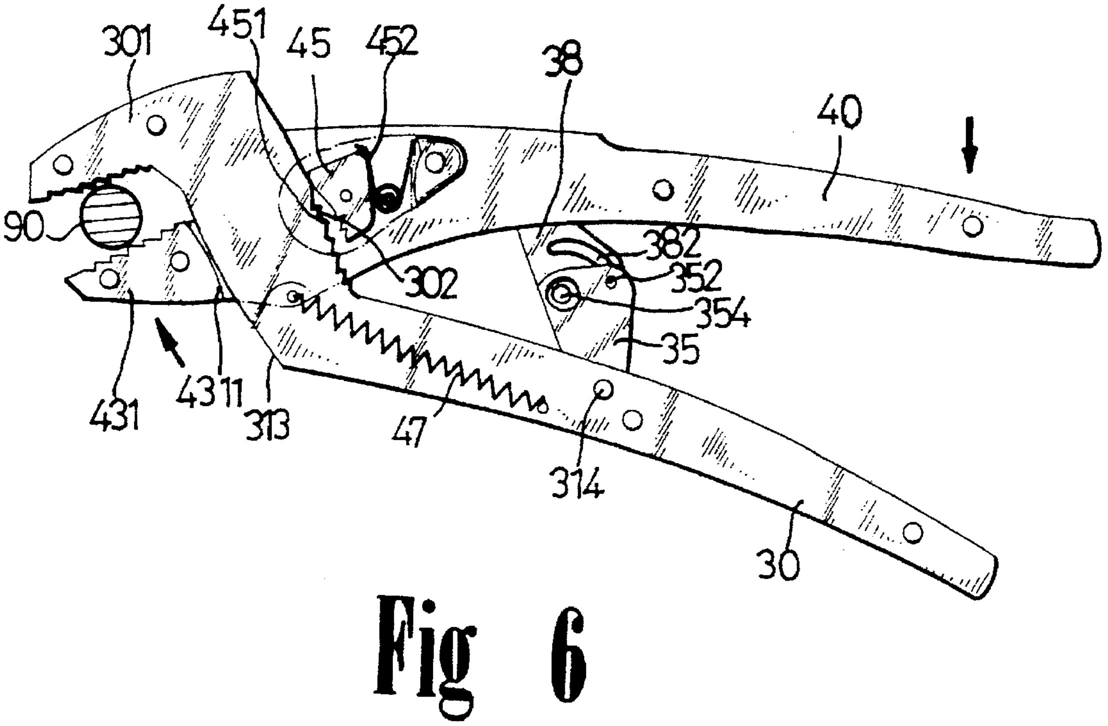

In operation, as shown in FIGS. 2 and 3, the spring 47 may bias the jaw ends of the handle members 30, 40 away from each other, and the rounded contact ends 453, 463 of the pawls 45, 46 may be biased to engage with the racks 302, 312 by the springs 452, 462. At this moment, the pin 352 is engaged in one end of the curved slot 382. As shown in FIGS. 5 and 6, the jaw ends of the handle members 30, 40 may be moved toward each other against the spring 47 for gripping a workpiece 90 when the handle ends of the handle members 30, 40 are moved toward each other. At this moment, the contact edges 4311, 4322 of the stops 431, 432 are slidably engaged with the contact surfaces 303, 313 of the handle member 30. As shown in FIG. 7, when the handle ends of the handle members 30, 40 are further pulled toward each other, the handle member 40 and the pawls 45, 46 may be caused to move toward the racks 302, 342 such that the pawls 45, 46 may be rotated about the rod 44 against the springs 452, 462 and such that the toothed ends 451, 461 of the pawls 45, 46 may engage with the racks 302, 342 so as to secure the intermediate portions together and so as to prevent the intermediate portions from moving one relative to the other. At this moment, the contact edges 4311, 4322 of the stops 431, 432 are disengaged from the contact surfaces 303, 313 of the handle member 30.

Figure 8:
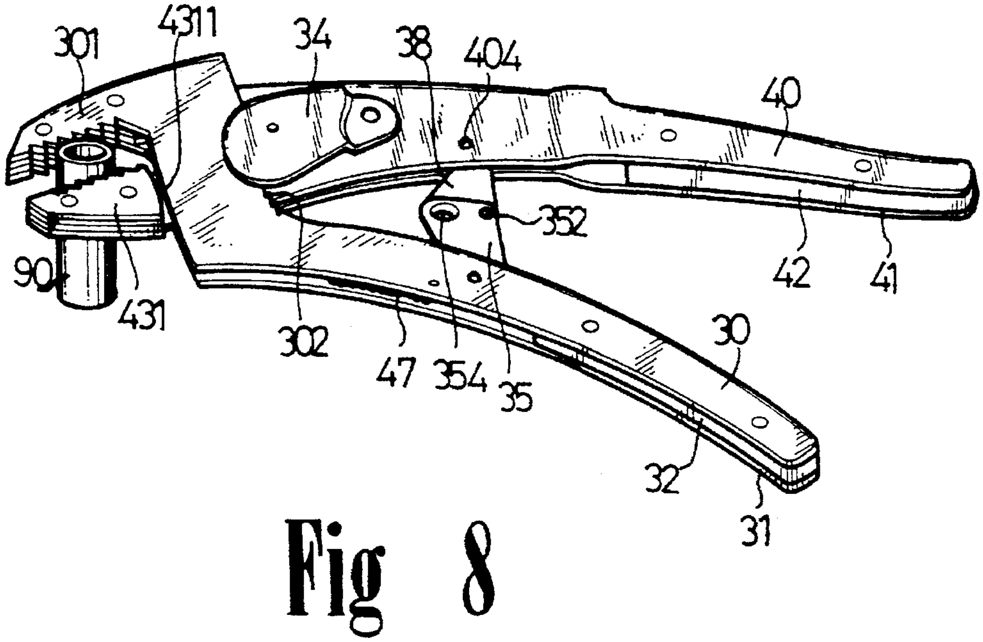
FIG. 8 is a perspective view of the utility plier illustrating the operation of the utility plier.
Figure 9:
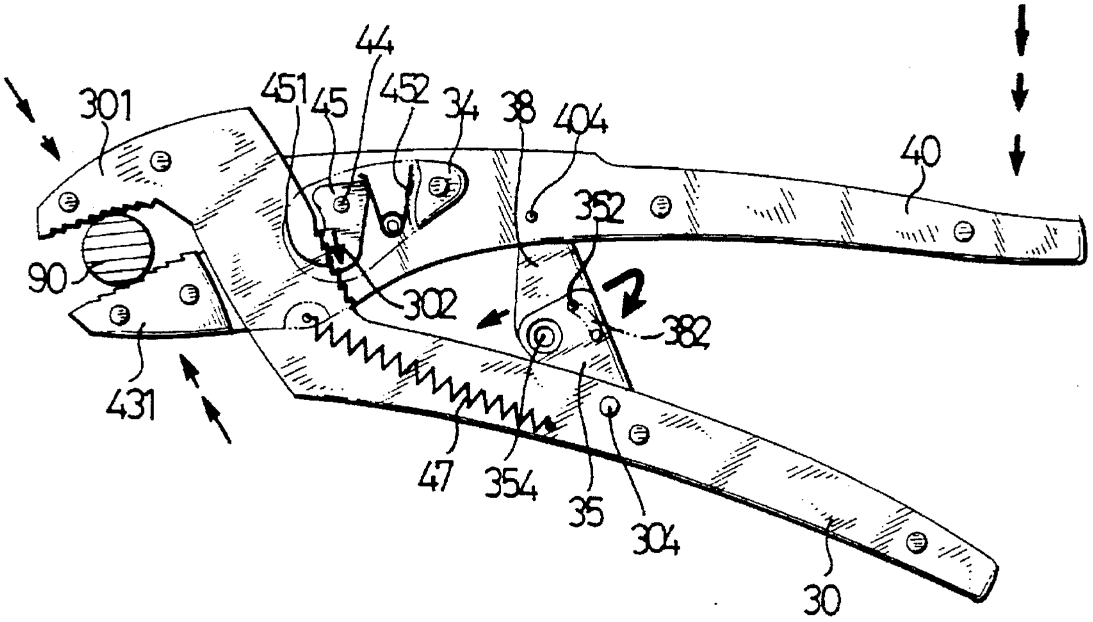
FIG. 9 is a plane view illustrating the operation of the utility plier.

As shown in FIGS. 8 and 9, when the handle ends of the handle members 30, 40 are further pulled toward each other, the panels 35, 36 may be forced to rotate relative to the plate 38 about the shaft 354 and the pin 352 may be forced to move to the other end of the curved slot 382. At this moment, the workpiece 90 may be solidly gripped between the jaw ends of the handle members 30, 40.

It is to be noted that the intermediate portion of the handle member 30 is not required to be formed with the elongate slots such that the strength of the handle member 30 can be greatly increased to at least three times of that of the conventional pliers. In addition, the springs 452, 462 may force the rounded contact ends 453, 463 of the pawls 45, 46 to engage with the handle member 30 and may prevent the toothed ends 451, 461 of the pawls 45, 46 from engaging with the racks 302, 312 before the jaw ends of the handle members 30, 40 are engaged with the workpiece 90. Furthermore, the sliding engagement of the pin 352 in the curved slot 382 may guide the rotational movement between the panels 35, 36 and the plate 38, and may limit the relative rotational movement between the panels 35, 36 and the plate 38. The springs 452, 462 may separate the handle ends of the handle members 30, 40 away from each other.

Accordingly, the utility plier in accordance with the present invention includes a pair of handle members having no slots formed therein such that the strength of the handle members may be greatly increased, and includes a plate and a pair of panels for separating the handle ends of the handle members away from each other.

Figure 10:
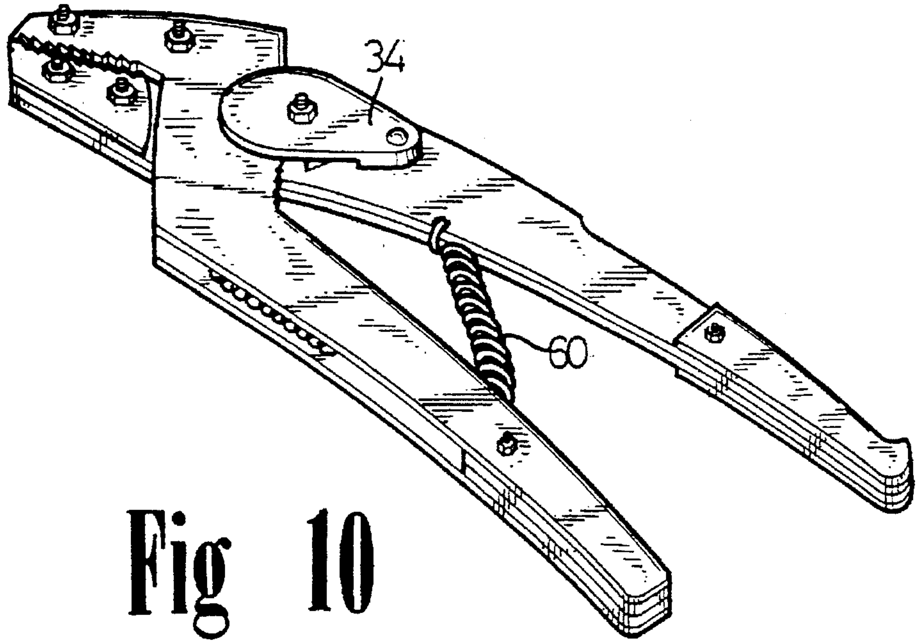
FIG. 10 is a perspective view showing another application of the utility plier.
Figure 11:
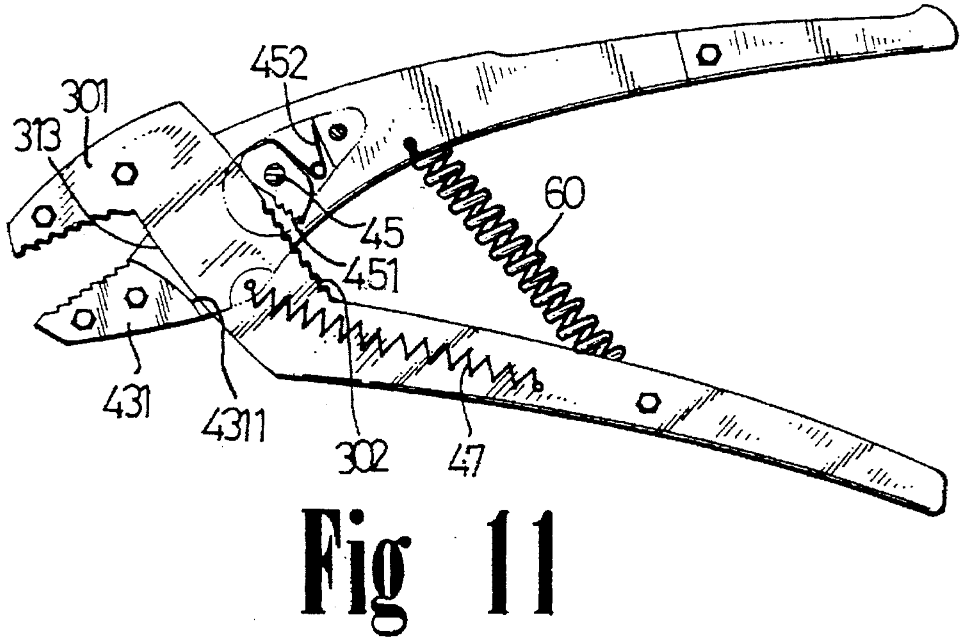
FIGS. 11 and 12 are plane views illustrating the operation of the utility plier as shown in FIG. 10.
Figure 12:
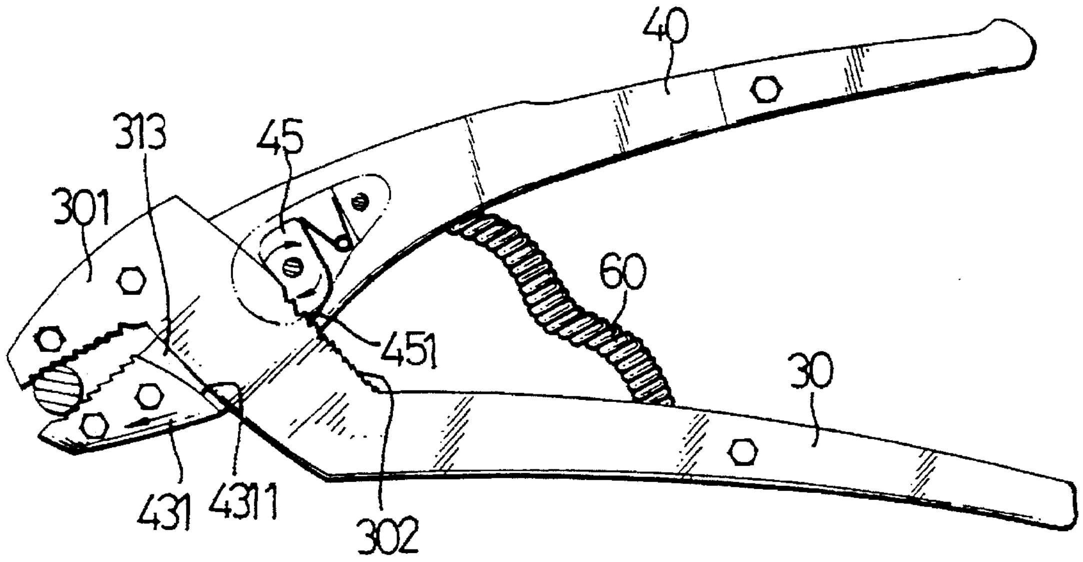
Figure 13:
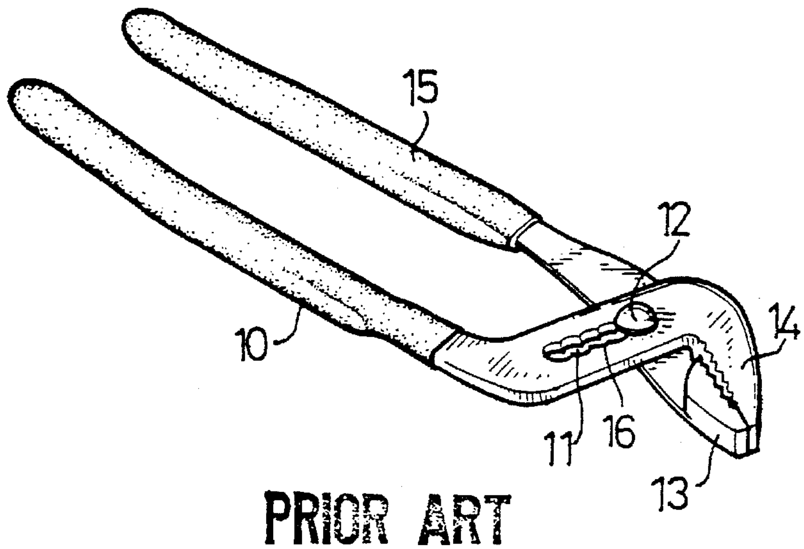
PRIOR ART Fig 13
FIGS. 13, 14 are perspective views illustrating two typical pliers.
Figure 14:
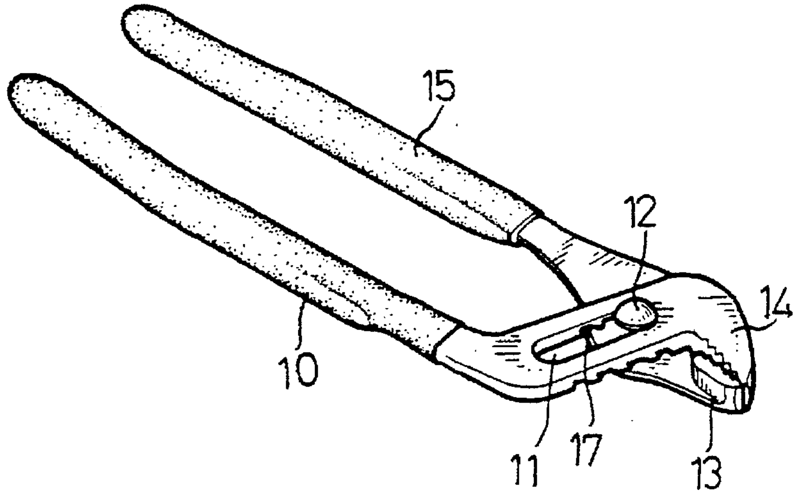
PRIOR ART Fig 14

Alternatively, as shown in FIGS. 10 to 12, an expansion spring 60 may be engaged between the handle ends of the handle members 30, 40 so as to separate the handle ends of the handle members 30, 40 away from each other.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pair of pliers comprising:

a first and a second non-channeled handle members including a first and a second jaw ends, a first and a second handle ends and a first and a second intermediate portions formed between said first and said second jaw ends and said first and said second handle ends respectively, said first intermediate portion of said first handle member including a pair of parallel planar members for slidably receiving said second intermediate portion of said second handle member therebetween, said first intermediate portion of said first handle member including a rack means located closer to said first handle end and including a contact surface means located closer to said first jaw end, said second handle member including a stop means secured on said second jaw end thereof for engaging with said contact surface means and for preventing said second intermediate portion from disengaging from said first intermediate portion, means for biasing said second jaw end away from said first jaw end, a pawl means pivotally secured on said second intermediate portion and including a toothed end for engaging with said rack means and including a contact end for engaging with said rack means and for preventing said toothed end from engaging with said rack means, and means for biasing said contact end of said pawl means to engage with said rack means, said second jaw end being moved away from said first jaw end so as to grip a workpiece of larger size, said stop means being caused to engage and to move along said contact surface means when said first and said second handle ends are moved toward each other in order to move said first and said second jaw ends toward each other so as to grip the workpiece, said second handle member being moved relative to said first handle member so as to rotate said pawl means in order to engage said toothed end with said rack means and so as to secure said first and said second intermediate portions together when said first and said second jaw ends grip the workpiece therebetween, wherein said first intermediate portion includes a solid configuration having no slots formed therein so as to increase a strength of said first handle member.

2. A pair of pliers according to claim 1 further comprising a panel means pivotally coupled to said first handle end of said first handle member, a plate means pivotally coupled to said second end of said second handle member and pivotally coupled to said panel means at a shaft, said plate means including a curved slot having a curvature located at said shaft, and said panel means including a pin element extended therefrom and slidably engaging with said curved slot so as to limit a rotational movement between said panel means and said plate means.

3. A pair of pliers according to claim 1 further comprising a cover means secured to said second handle member for covering and for protecting said pawl means.

* * * * *